Sept. 8, 1925. Re. 16,162

E. R. ALEXANDER

APPARATUS FOR TREATING SERUM

Original Filed Feb. 17, 1923

INVENTOR
Elliot R. Alexander
BY Arthur L. Burns
ATTORNEY

Reissued Sept. 8, 1925.

Re. 16,162

UNITED STATES PATENT OFFICE.

ELLIOT R. ALEXANDER, OF KANSAS CITY, MISSOURI

APPARATUS FOR TREATING SERUM.

Original No. 1,539,102, dated May 26, 1925, Serial No. 619,599, filed February 17, 1923. Application for reissue filed July 20, 1925. Serial No. 44,081.

*To all whom it may concern:*

Be it known that I, ELLIOT R. ALEXANDER, a citizen of the United States, residing at Kansas City, in the county of Jackson and State of Missouri, have invented certain new and useful Improvements in Apparatus for Treating Serum; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to an apparatus for preparing serum and particularly for the treatment of anti-hog cholera serum in which the serum is rendered most potent for the purpose intended in an efficient and expeditious manner, the present application being a division of my co-pending application, Serial No. 347,335, filed December 26, 1919.

It has generally been the practice to produce serum by procuring healthy, immune hogs and hyperimmunizing them by injecting virulent blood into their ear vein. At the end of about ten days these hogs are bled and after the first bleeding, the bleeding is repeated at intervals of about seven days. This crude blood is then refined by placing it in containers carried by powerful centrifugal machines revolving at a rate sufficient to throw down all the blood corpuscles, bacteria and solid inert material, leaving only the clear, pure, refined serum. The serum should then be sterilized at a temperature sufficient to kill all germs or bacteria, as well as to coagulate or solidify the soluble fibrin. It is then subjected to a second centrifuging operation so as to precipitate the fibrin, leaving a clear amber colored liquid. It is then bottled and tested further for sterility and potency. The Bureau of Animal Industry of the United States now recognizes that a clear serum is very much more concentrated and stronger in potency than blood serum and as a result of investigation, the Department of Agriculture has made it mandatory that blood serum, that is, serum which has not been defibrinated, must be used in considerably larger doses than clear serum. The potency of clear serum, however, can be rendered quite inefficient by improper treatment and since the known method of defibrinating serum involves the use of high power centrifugal machines, the preparation of the serum has hitherto been unnecessarily expensive because the treatment involved placing the blood in the containers of the centrifugal machines and then sterilizing it in the containers with the result that the machine stood idle during the period of sterilization.

In view of the fact that the centrifugal machines must operate at relatively high speeds, generally at a peripheral speed of about two miles per minute, the containers must be constructed of relatively heavy material necessitating thick walls and of excessive weight not easily adapted for handling. Attempts have been made to defibrinate the blood by introducing it into receptacles and placing the receptacles in the containers of the centrifugal machine but the centrifugal force has been found to be so great that the receptacles break down and soon become destroyed.

According to my apparatus, the serum is placed in a receptacle, the walls of which may be relatively thin, and the receptacle is then introduced into a container, usually the container furnished by the manufacturers of the centrifugal machines, care being taken that the walls of the receptacle lie snugly against the inner surfaces of the containers so that any tendency of the walls of the receptacles to bulge or disrupt, due to the centrifugal force of the machine, will be efficiently resisted by the bulky, heavy container and after the centrifuging operation has been completed, that is, after the machine has operated long enough to effect the precipitation of the solids in the blood, the receptacle is removed and placed in a sterilizer or heater a sufficient length of time to kill all germs, bacteria, etc., as well as to coagulate or solidify the soluble fibrin. The inner receptacle which conforms substantially throughout to the cylindrical outer receptacle or member is spaced from the outer receptacle sufficiently to prevent adhesion under high centrifugal pressure and the wall of the outer receptacle is sufficiently close to prevent permanent distortion of the inner receptacle when the same is subjected to such high centrifugal pressure. The product is again subjected to the action of the centrifugal machine to cause the precipitation of the fibrin whereupon the clear serum may be bottled, ready for use.

According to my invention, the blood serum may be introduced into the receptacle and the receptacle sealed, it being unnecessary to open it or pour out the contents until after the sterilization takes place, this being an important step in advance of known methods since the serum need not be subjected to contamination between the time that the hog is bled and the time the finished product is bottled.

The receptacle and container constitute substantially a double walled receptacle, the inner wall of which is relatively thin to permit ease in sterilization, and the outer wall of which is relatively thick to resist the tendency to warp or disrupt under the action of the centrifugal force when the machine is operating, it being important that the two walls lie close together so that there will be no opportunity for the inner wall to bulge or otherwise distort.

From the foregoing it will be apparent that according to the method described, the liability of contamination during the handling of the serum will be eliminated and it will also be apparent that the method may be concluded in less time than ordinarily employed for a similar result and that the machine may be in practically continuous operation since a number of receptacles may be provided for each container so that when defibrinating of the serum in one set of receptacles has been finished, the receptacles may be removed and another set introduced, permitting the machine to produce the defibrination in one set of receptacles while the serum in the other set is being sterilized and since the receptacles may be provided with covers, the blood contained therein waiting to be conveyed to the centrifuging machine will be sealed from contamination from an exterior source.

As illustrative of a mechanism for carrying out the method, I have shown a known form of centrifuging machine sufficiently modified to perform the functions intended.

Figure 1:
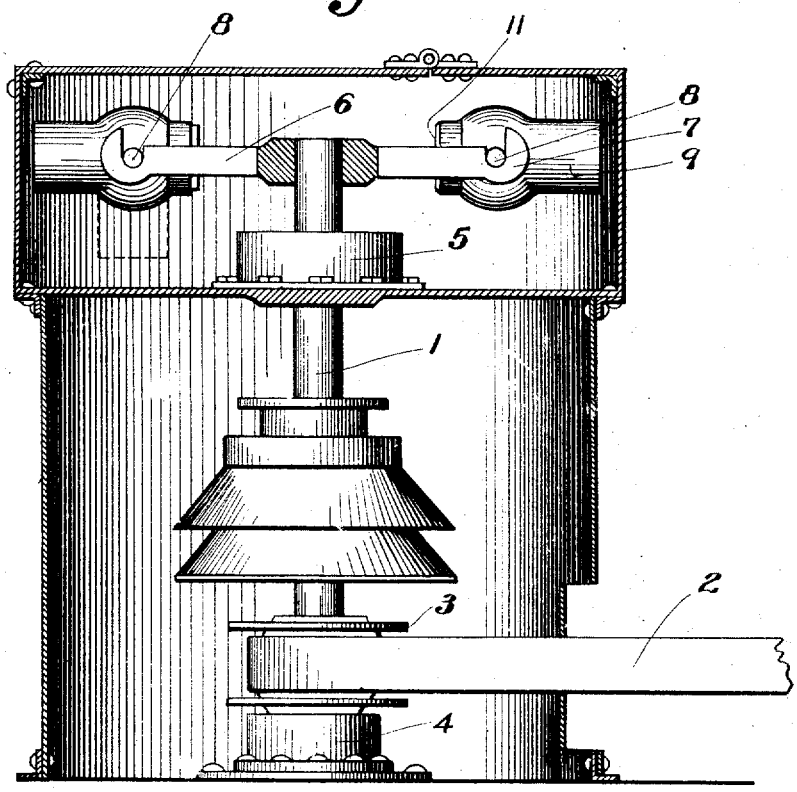
Fig. 1 is a side elevational view of a centrifuging machine constructed in accordance with my invention.
Figure 2:
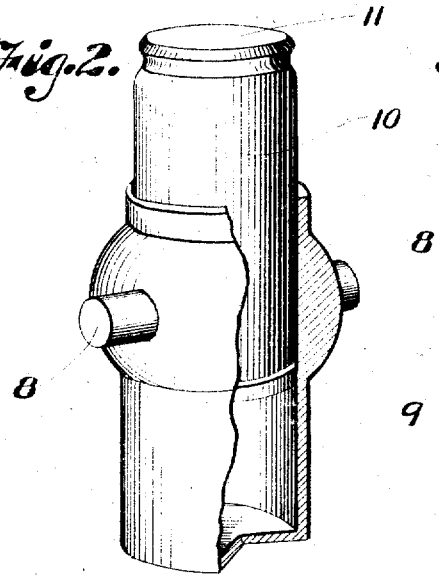
Fig. 2 is a detail view of one of the containers, showing the receptacle or inner lining partially withdrawn.
Figure 3:
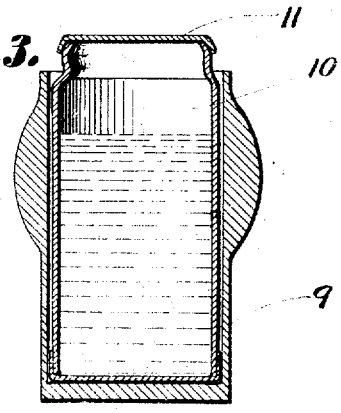
Fig. 3 is a vertical, longitudinal, sectional view through the double walled container.

The centrifuging machine is illustrated as consisting of a shaft 1 driven by a belt 2 from a suitable source of power by passing around the pulley 3. The shaft 1 is in bearings 4 and 5 and at its upper end it is provided with radial arms 6 having hooked extremities 7 to receive the trunnions 8 of the outer wall or container 9. The container 9 is provided with relatively thick walls to withstand the centrifugal force and serving as a reinforcing member for the inner wall or receptacle 10, which contains the blood serum to be treated, the receptacle 10 being provided with a lid or cover 11.

It will be apparent that when the parts are assembled as shown in Fig. 1 and the centrifuging machine is operating, the members 9 will assume substantially horizontal positions due to the centrifugal force generated and that defibrinating will take place. After a suitable time the inner wall or receptacle 10 may be removed and conveyed to a sterilizer, substitute receptacles being introduced into the members 9 so that a substantially continuous operation may be maintained.

What I claim and desire to secure by Letters Patent is:—

1. A double walled centrifugal separator container, the outer wall of which consists of an outer receptacle having substantially thick walls, and the inner wall of which consists of a receptacle having substantially thin walls adapted to bulge under excessive pressure, the inner receptacle conforming substantially throughout to the inner surface of the outer receptacle with its outer surface in such proximity to the inner surface of the outer receptacle as to prevent permanent distortion of the inner receptacle, there being sufficient space between the inner and outer walls to prevent adhesion under high centrifugal pressure.

2. A double walled centrifugal separator container, the outer wall of which consists of a substantially cylindrical outer member having relatively thick walls and provided with opposite trunnions for pivotally mounting the container in a centrifugal machine and the inner wall of the said container consisting of a receptacle having substantially thin walls adapted to bulge under excessive pressure, the inner receptacle conforming substantially throughout to the cylindrical outer member with its outer surface in such proximity to the inner surface of the hollow member as to prevent permanent distortion of the inner receptacle, there being sufficient space between the inner and outer walls to prevent adhesion under high centrifugal pressure.

In testimony whereof I affix my signature.

ELLIOT R. ALEXANDER.